(12) United States Patent
Maunier et al.

(10) Patent No.: US 11,336,461 B2
(45) Date of Patent: May 17, 2022

(54) METHOD FOR CONTROLLING BY A SERVER THE USE OF AT LEAST ONE DATA ELEMENT OF A DATA OWNER

(71) Applicant: THALES DIS FRANCE SA, Meudon (FR)

(72) Inventors: Gérald Maunier, Meudon (FR); Ludovic Tressol, Meudon (FR); Frederic Dao, Meudon (FR)

(73) Assignee: THALES DIS FRANCE SA, Meudon (FR)

(*) Notice: Subject to any disclaimer, the term of this patent is extended or adjusted under 35 U.S.C. 154(b) by 202 days.

(21) Appl. No.: 16/955,980

(22) PCT Filed: Dec. 7, 2018

(86) PCT No.: PCT/EP2018/084056
§ 371 (c)(1),
(2) Date: Jun. 19, 2020

(87) PCT Pub. No.: WO2019/121075
PCT Pub. Date: Jun. 27, 2019

(65) Prior Publication Data
US 2021/0021430 A1    Jan. 21, 2021

(30) Foreign Application Priority Data

Dec. 20, 2017 (EP) .................................. 17306848

(51) Int. Cl.
*H04L 9/32* (2006.01)

(52) U.S. Cl.
CPC ............ *H04L 9/3247* (2013.01); *H04L 9/321* (2013.01)

(58) Field of Classification Search
CPC ........ H04L 9/3247; H04L 9/321; H04W 4/70; H04W 12/02; G06F 2221/2115
See application file for complete search history.

(56) References Cited

U.S. PATENT DOCUMENTS 10,311,433 B2 *   6/2019   Carrott ................. G06Q 20/40
10,965,690 B2 *   3/2021   Phan ..................... H04L 63/126
(Continued)

FOREIGN PATENT DOCUMENTS

| WO | 2014045173 A1 | 3/2014 | |
| WO | WO2017190795 A1 | 11/2017 | |
| WO | WO 2020/117549 A1 * | 6/2020 | ............. H04L 12/24 |

OTHER PUBLICATIONS

PCT/EP2018/084056 International Search Report, dated Jan. 30, 2019, European Patent Office, P.B. 5818 Patentlaan 2 NL—2280 HV Rijswijk.
(Continued)

*Primary Examiner* — Christopher A Revak
(74) *Attorney, Agent, or Firm* — The Jansson Firm; Pehr B. Jansson

(57) ABSTRACT

The invention relates to a method for controlling by a server called secure server the use of a first set of at least one data element of a data owner and provided by a communication device, the method comprising the steps of: receiving at least one digital signature representative of a process authorized by the data owner and adapted to carry out a series of at least one instructions using the first set of at least one data element; receiving from a process entity the series of at least one instruction, and a ciphered version of the first set of at least one data element which is communicated to the process entity by the communication device; verifying that the series of at least one instruction correspond to a process authorized by the data owner of the communication device by comparing the at least one digital signature received by the secure server with a digital signature obtained by the secure server using as an input the series of at least one instruction received by the secure server; and if the series of at least one instruction correspond to an authorized process: deciphering the first set of at least one data element; generating a result
(Continued)

data by executing the series of at least one instruction using the first set of at least one data element as an input; transmitting the result data to the process entity.

21 Claims, 2 Drawing Sheets

(56) References Cited

U.S. PATENT DOCUMENTS

| | | | |
|---|---|---|---|
| 2012/0017081 A1* | 1/2012 | Courtney | H04L 9/3263 |
| | | | 235/382 |
| 2016/0112456 A1 | 4/2016 | Pearson et al. | |
| 2017/0061131 A1* | 3/2017 | Santos | H04W 12/128 |
| 2017/0310645 A1* | 10/2017 | Fransen | H04L 63/061 |
| 2018/0091484 A1* | 3/2018 | Atta | H04L 63/0428 |
| 2020/0045019 A1* | 2/2020 | Huang | H04L 63/18 |

OTHER PUBLICATIONS

PCT/EP2018/084056. Written Opinion of the International Searching Authority, dated Jan. 30, 2019, European Patent Office, D-80298 Munich, Germany.

* cited by examiner

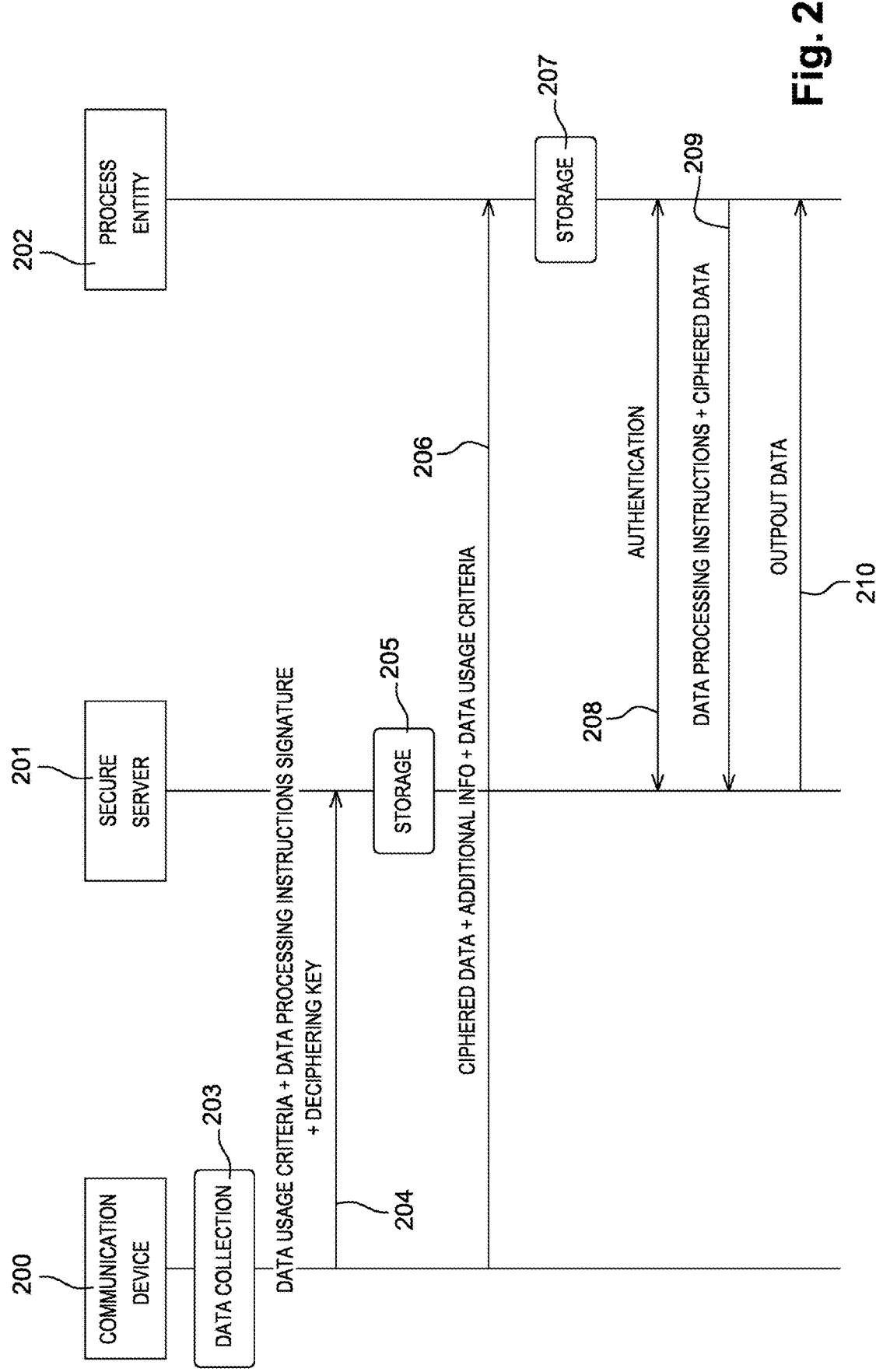

METHOD FOR CONTROLLING BY A SERVER THE USE OF AT LEAST ONE DATA ELEMENT OF A DATA OWNER

TECHNICAL FIELD

The present invention relates to a method for controlling by a server the use at least one data element of a data owner. It is applicable to the protection of data privacy in an Internet of Things (IoT) network.

BACKGROUND OF THE INVENTION

According to the Recommendation ITU-T Y.2060 provided by the International Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, IoT is generally applied in fields such as security surveillance, automatic vending machines, public traffic systems, vehicle monitoring and management, industry process automatization, motor machineries, city informationalization.

In this description, the expression communication device refers to a piece of equipment with communication capabilities and when needed, capacity of sensing/capturing/registering/processing and sending data.

Communication devices used in an Internet of Things ecosystem are generally cheaper than regular communication terminals such as smartphones, in particular if they have limited storage capabilities. These communication devices can be configured to collect and transmit data to one or several servers. These servers need to be capable of managing data storage and to protect the privacy of the collected data. However, once data are provided by the communication device to the remote server, it can be difficult to control its usage.

For example, when considering a communication device such as an house smart meter, an inner or man in the middle attacker that have access to data collected in real time could use it to detect the presence or the absence of the occupants if there is someone in the house or if the place is free in which case a robbery may occur.

Therefore, it would be advantageous to have an improved method and apparatus allowing to condition usage and/or the propagation of data provided by a communication device to a remote apparatus.

SUMMARY OF THE INVENTION

The invention relates to a method for controlling by a server called secure server the use of a first set of at least one data element of a data owner and provided by a communication device, the method comprising the steps of:
  receiving at least one digital signature representative of a process authorized by the data owner and adapted to carry out a series of at least one instructions using the first set of at least one data element;
  receiving from a process entity the series of at least one instruction, and a ciphered version of the first set of at least one data element which is communicated to the process entity by the communication device;
  verifying that the series of at least one instruction correspond to a process authorized by the data owner of the communication device by comparing the at least one digital signature received by the secure server with a digital signature obtained by the secure server using as an input the series of at least one instruction received by the secure server;
  and if the series of at least one instruction correspond to an authorized process:
    i. deciphering the first set of at least one data element;
    ii. generating a result data by executing the series of at least one instruction using the first set of at least one data element as an input;
    iii. transmitting the result data to the process entity.

According to an example, the at least one digital signature representative of the process authorized by the data owner is received by the secure server from the communication device.

According to an example, the at least one digital signature representative of the process authorized by the data owner is received by the secure server from a device on which the data owner is authenticated, said device being distinct from the communication device.

According to an example, the method comprises the step of receiving in addition to the at least one digital signature representative of a process authorized by the data owner a second set of at least one data element defining at least one condition to be met for processing the first set of at least one data element.

According to an example, the second set of at least one data element is received by the secure server from the communication device.

According to an example, the second set of at least one data element is received by the secure server from a device on which the data owner is authenticated, said device being distinct from the communication device is received by the secure server from a device on which the data owner is authenticated, said device being distinct from the communication device.

According to an example, the method comprises the step of verifying that the at least one condition defined by the second set of at least one data element is met before applying the step of deciphering the first set of at least one data element.

According to an example, at least one data element of the second set defines a limited time availability for the first set of data elements to be processed by the process entity.

According to an example, at least one data element of the second set defines a price to be paid by an operator of the process entity to obtain the data result determined by the secure server.

According to an example, the digital signature is obtained using as an input the instructions of the process authorized by the data owner.

The invention also related to a secure server for controlling the use of a first set of at least one data element of a data owner and provided by a communication device, the secure server being configured to:
  receive at least one digital signature representative of a process authorized by the data owner and adapted to carry out a series of at least one instructions using the first set of at least one data element;
  receive from a process entity the series of at least one instruction, and a ciphered version of the first set of at least one data element which is communicated to the process entity by the communication device;

verify that the series of at least one instruction correspond to a process authorized by the data owner of the communication device by comparing the at least one digital signature received by the secure server with a digital signature obtained by the secure server using as an input the series of at least one instruction received by the secure server;

and if the series of at least one instruction correspond to an authorized process:
  i. decipher the first set of at least one data element;
  ii. generate result data by executing the series of at least one instruction using the first set of at least one data element as an input;
  iii. transmit the result data to the process entity.

The invention also relates to a system comprising a communication device, a process entity and a server called secure server for controlling the use of a first set of at least one data element of a data owner and provided by the communication device, the system being configured to implement the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings:

FIG. 2 is an example of sequence diagram illustrating how a secure server provides results to a process entity requesting them.

DETAILED DESCRIPTION

Figure 1:
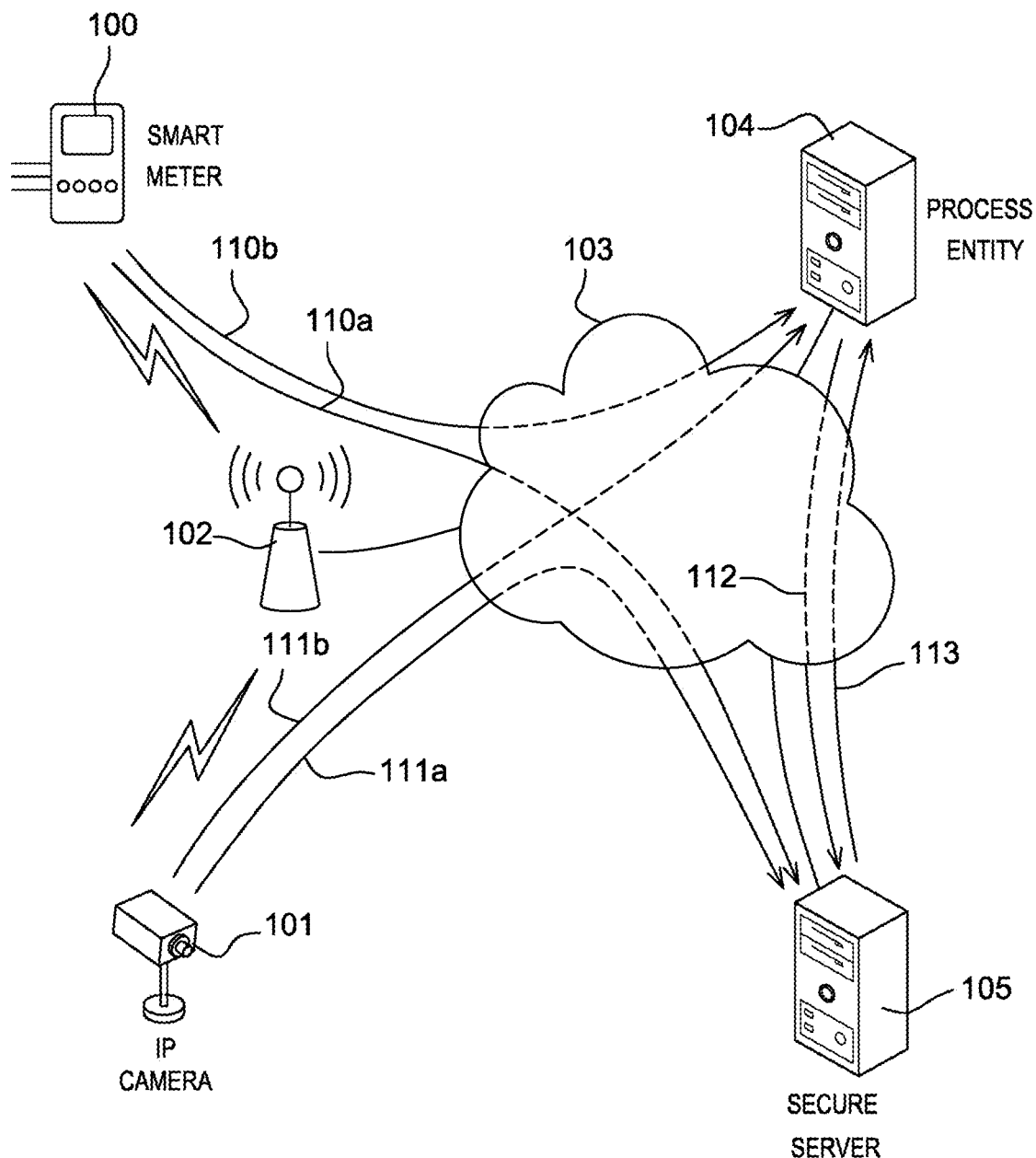
FIG. 1 is a schematic representation of a communication system designed to monitor the usage of data provided by one or several communication devices.

FIG. 1 is a schematic representation of a communication system designed to monitor the usage of data provided by one or several communication devices.

According to this example, the communication system comprises one or several communication devices 100, 101, a communication mean 102, a process entity 104 and a secure server 105.

The communication devices 100, 101 can be of the type of an IoT communication endpoint, such as a smart-meter, a connected household appliance, a smartlock or smarthome sensors.

These communication devices can collect data using one or several embedded sensors or generate data by themselves representative of their usage. However, these examples are not limitative and other types of communication devices can be used. For example, smartphones or tablet computers can also be used. Therefore, the skilled person will appreciate that the invention is applicable for traditional communication systems such as wireless communication systems and more generally communication networks such as the internet.

A wireless access point 102 belonging to a given wireless communication network operated by a mobile network operator (MNO) is schematically represented. It can be for example a nodeB of an UMTS network or an enodeB of an LTE network. The other elements of the wireless communication network are not represented for the purposes of simplification. The wireless network is connected to a wide area network (WAN) 103, for example the Internet. This allows the communication devices to communicate with remote entities, for example a process entity 104 and a secure server 105.

The process entity 104 is an apparatus such as a server or a particular type of communication device which is adapted to run a process on a set of data elements provided by one of the communication devices 100, 101 or any other communication means like radio/cable.

In this description, a process refers to a set of at least one instruction which is adapted to be applied to a set of at least one input data element to provide an output data element.

The secure server 105 is an apparatus which role is to enforce the processing entity 104 use data provided by the communication devices 100, 101 only when associated criteria are fulfilled.

In this description, a data owner refers to someone having rights to control the use made by third parties of a set of at least one data element.

This technology provides means for a data owner to control the use of its data generated or made available through one or several communication devices, for example a smart meter 100 and an IP camera 101. The data owner can transmit for that purpose one or several encryption/decryption keys to the secure server. A digital signature of the process or processes which are allowed by the data owner to be applied on his data is generated and communicated securely 110a, 111a to the secure server 105 using said encryption/decryption keys.

The one or several data elements are enciphered by the communication devices 100, 101 and collected 110b, 111b by the process entity 104. The process entity 104 is not provisioned with the keys that are required for deciphering the data elements. When a process entity 104 would like to obtain the result of a given process applied to a given set of collected data elements, a data exchange is set up with the secure server 105 for that purpose. As an example, the process entity 104 sends a request message 112 to the secure server 105. This request comprises the one or several data elements enciphered as well as the instructions of the process to be carried out on said data elements.

The secure server 105 is capable of deciphering the received data elements, to apply the process requested by the process entity and to provide the obtained results to the process to the process server 104. One important aspect of the invention is that the secure server 104 is adapted to verify if it is allowed by the data owner for the process entity 104 to get these results. For that purpose, the secure server 105 derive a digital signature from the instructions of the process provided by the process entity 104 and compare it with the one or several electronic keys provided by the data owner. If one of the digital signatures provided by the data owner is identical to the one derived from the instructions contains in the request message 112, this means that the secure server 105 is allowed to run the corresponding process.

Once this has been checked, the one or several data elements provided by the process entity 104 to the secure server 105 are deciphered, and the instructions of the requested process are applied by the security server 105 on the deciphered data elements. The obtained results are then transmitted 113 by the secure server to the process entity 104.

One important advantage is that the process entity 104 has no access to the data elements provided by the communication devices 100, 101. It is able to get the results of the application of a given process to this data element only if allowed by the data owner. Therefore, the security server allows the data owner to control the use of the data elements provided by the communication devices 100, 101.

According to an aspect of the invention, in addition to verify that running the process requested by the process entity 104 on the collected data elements is authorized by the data owner, the secure server 105 can also verify that one or several usage criteria are fulfilled for processing the data elements. Several examples of usage criteria are provided below for exemplary purpose and should not be considered as limitative:
- verifying that the processing request is received in a period of time defined by the data owner;
- verifying that the process entity is identified as authorized for processing a particular type of data, for example data elements representative of the data consumption of an household;
- verifying that a payment transaction has been done and authorizing the usage of the data element accordingly;
- verifying that the collected data elements are managed by a common process, a common process being a process applied on a plurality of data elements provided by different communication devices and transmitted by one or more process entity to the secure server.

FIG. 2 is an example of sequence diagram illustrating how a secure server provides results to a process entity requesting them.

The sequence diagram involves several entities namely a communication device 200, a secure server 201 and a process entity 104 which are corresponding respectively to the entities 100/101, 105 and 104 depicted with FIG. 1.

According to this example, the communication device 200 collects data elements 203. For that purpose, it can use one or several sensors, for example a digital camera, a thermometer, an presence detector, measurement means for electrical consumption or any kind of sensor that can be embedded or cooperate with the communication device 200.

The data elements then needs to be transmitted to an external system for being processed. They can be collected by the communication device 200 on a regular basis, for example on a periodically. Alternatively, the data collection can be triggered based on a predefined event.

As an example, for monitoring the electricity consumption of households, the data elements can be transmitted by a smart meter to a process entity 202 operated by the energy utility providing the electricity.

According to the invention, the data elements are transmitted enciphered to the process server which therefore has no access to them. The secure server 201 is configured to decipher the data elements and to apply one or several processes to them, when authorized.

According to an aspect of the invention, the secure server 201 is operated by a third party independent from the one operating the process entity 202 and which can be considered as a trusted third party by the data owner.

The data owner can set up preferences, or data usage criteria, defining the way the process server can use the provided data elements. For example, the data owner allows the process entity 202 to access to the number of kilowatt per hour (kW/h) consumed by the household over a given period of time as well as an average of the consumption during daytime and an average of the consumption during nighttime. In that case, the data owner wants to make sure that the process entity has no access to a detailed planning of the household consumption in real time allowing the process entity to determine when a given housing is empty or occupied. For example, the access to the result obtained after processing the collected data elements can be delayed. For that purpose, an availability date can be defined.

The data owner is able to communicate his preferences to the secure server 201, for example using the communication device 200. For that purpose, a message is transmitted by the communication device 200 to the secure server 204 comprising a digital signature called data processing instructions signature and/or one or several data usage criteria.

Alternatively, the preferences can be communicated to the secure server 201 by the data owner with a device distinct from the communication device 200 collecting the data elements. For example, the data owner can use a laptop computer, and can provide his preferences by establishing a secure communication channel with the secure server 201. These preferences can be taken into account by the secure server 201 once the data owner is correctly authenticated.

According to an embodiment, the data processing instructions signature is a digital signature representative of one or several processes to be applied on the reported data elements and allowed by the data owner.

In this description, a digital signature refers to a digest of a message characterising the data with a low risk of error in view of the level of a required integrity level.

In the scope of this invention, the message can be:
- a collection of at least one instruction implementing the one or several allowed processes;
- a portion of the collection of at least one instruction implementing the one or several allowed processes;
- a compressed version of the at least one instruction implementing the one or several allowed processes;

The digital signature can be an authenticated digest, that is to say a cryptographic digest that takes account of a secret element, in addition to the data of which it is a check sum. For example, the authenticated digest may be of the HMAC type (keyed-Hash Message Authentication Code). That authenticated digest is calculated using a cryptographic hashing function in combination with a secret key.

RSA (Rivest Shamir Adleman) or DSA (Digital Signature Algorithm) may also be used as a signing algorithm to generate the digital signature.

In addition to the data processing instructions signature, one or several usage criteria can also be transmitted by the data owner to the secure server 201. The one or several usage criteria define conditions for the process entity 202 to use the collected data elements.

For example, a given usage criteria can define a limited time availability for the collected data elements to be processed by a given process entity. As an example, data collected and reported by a smart meter can be available for a one year period. Outside of this period of time, the process entity will not be able get any results from processing these data elements.

Another type of usage criteria can be defined allowing the data owner to monetize its collected data elements. For example, a given usage criteria can define an amount that needs to be paid for processing the collected data elements. In that case, the process entity 202 needs to provide a proof that a required amount has been paid. A payment transaction proof signed by a bank security certificate can be used for that purpose. This proof can be provided by the Process entity when requesting the execution of a process on a data stored by the secure server.

According to the example depicted on FIG. 2, a data processing instructions signature and a set of data usage criteria are transmitted 204 by the communication device 200 to the secure server 201 and stored 205 for later use.

It is to be noted that in the example of FIG. 2 several messages are described as transmitting several different types of data. For example, message 204 is depicted as comprising a data processing instructions signature and possibly a data usage criteria. This is for exemplary purposes and the skilled person will understand that several messages can be used for transmitting the same data. For example a first message can be used to transmit the data processing instructions signature and a second process can be used to transmit the data usage criteria.

An identifier COM_ID of the communication device 200 can also be transmitted to the secure server 201 by the communication device 200. An identifier DAT_ID of the type of collected data that will be reported to the one or several process entities 202 can also be provided to the secure server 201 by the communication device 200.

Data elements collected 203 by the communication device 200 are transmitted enciphered to the process entity 206.

The identifier COM_ID and/or DAT_ID can also be transmitted together with the collected data elements.

In addition, an address of the secure server 201 can also be transmitted to the process entity 202. This address is for example an Internet Protocol address (IP address). The skilled person will appreciate that other types of addresses allowing to identify the secure server in a computer network in order to reach it for setting up a data exchange.

According to an embodiment, the communication device 200 and the secure server 201 are provisioned with a secret key Tk allowing the communication device 200 to encipher the collected data elements and the secure server 201 to decipher them when needed. This secret key Tk can be diversified for each of the communication devices in the system. In that case, the secure server 200 has to memorize a plurality of secret key Tk as one secret key is needed for each communication device.

Alternatively, a public key infrastructure (PKI) can be used. In that case, the secure server 201 uses a secret key to decipher the collected data elements, whereas the communication devices use a public key corresponding to this secret key in order to encipher the collected data elements.

According to another embodiment, the secure server 201 is provisioned with a key pair comprising a secret key Ks and a public key Kp known by the communication device 200. The communication device then generates a random secret key Kr to encipher messages which are communicated to the secure server 201. The random secret key Kr is ciphered using the public key Kp and the communication device 200 transmits the ciphered version of Kr to the secure server 201. The secure server 201 is able retrieve the secret key Kr from its ciphered version using Ks. At this stage, the secure server 201 is able to decipher the messages received from the communication device 200 using Kr.

Alternatively, a key pair composed of a public key Krp and a secret key Krs can be used in place of the secret key Kr. In that case the public key Krp is transmitted to the secure server enciphered using Kp. Krs is used by the communication device 200 to encipher messages which are then communicated to the secure server 201

Alternatively, the data owner may configure both his device 200 and the secure server 201 with a secret Owner-KeyEncryptionKey, then the communication device 200 can generate a random message encryption key, encrypt the message with it, then encrypt the message encryption key with the OwnerKeyEncryptioKey. The secure server 201 will then use the OwnerKeyEncryptionKey to decrypt the random message encryption key and decrypt messages received from the communication device 200.

Alternatively, the data owner can configure the communication device 200 and the secure server 201 with a master encryption key. Then the communication device 200 can derive a per message encryption key using a message identifier, and use it to encrypt the content of the message. The secure server 201 is then performing the same derivation using the received message identifier and then decrypts the message with this derived key.

The collected data elements are transmitted enciphered by the communication device 200 to the secure server 210. In addition to the collected data elements, additional information can be transmitted by the communication device 201 to the process entity 202. As an example, information data informing the process entity on the allowed usage of the data elements can be transmitted. For example, the communication device can inform the process entity that the collected data elements can be processed during a given period of time. In addition, the communication device 200 can inform the process server 202 that the result of applying a process on the collected data elements is allowed only if a given amount is paid by the operator of the process entity 202. Said differently, the communication device 200 informs the process entity 202 of what it can do or not with the transmitted data elements. This information correspond for example to the usage criteria communicated to the secure server 202 by the data owner.

The process entity 202 stores 207 the data elements enciphered in its memory, as well as the additional data if such data is received.

It is to be underlined that the process entity 202 receives the collected data elements, however, these are enciphered. The process entity 202 is not able to access the data elements in clear as it does not have the required means to decipher them. The only entity which is able to decipher the collected data elements in the system apart from the communication device is the secure server 201. As a consequence, the secure server 201 is the only entity that is able to process the collected data elements and provide the result obtained by applying said process to said collected data elements.

When the process entity 202 needs to obtain some information derived from the stored data elements, a secure communication session is set up with the secure server 201 and the process entity 202. As an example, a mutual authentication is carried 208. Existing technologies can be used for that purpose and will therefore not be described.

After a successful authentication, the process entity 202 transmits 209 the enciphered data elements to the secure server 201. In addition, and according to an embodiment, it transmits the instructions of the process to be applied by the secure server 202 on these data elements.

Once this or these messages 209 are received, the secure server 201 verify if this authenticated process entity 202 is allowed by the data owner to process the ciphered data elements. For that purpose, it calculates a digital signature using the received process instructions. Then, the secure server 201 compares this digital signature with the data processing instructions signature previously received 204 from the data owner.

The security server 201 can receive ciphered data elements collected by the process entity 202 from a plurality of communication devices. In that case, the authorized process is a common process. The common process is therefore able to provide results relative to a plurality of communication devices and corresponding for example to a statistical analysis.

In case the secure server memorizes one or several usage criteria for these data, the secure server 201 checks if these are verified. It can for example verify that the request 209 of the process entity 202 is received at a date which is earlier that an expiration date, this expiration date being memorized by the security server 202 as a usage criteria. The expiration date correspond for example to a date at which the collected data items are not anymore available for generating a result requested by a process entity. Alternatively or in addition to the expiration date, an availability date can be used in order to define a date from which the collected data items are available for providing a result.

The communication between the secure server 201 and the process entity 202 can be secured for example by using a secret key Tk2 known by both entities and which can be used to encipher data exchanged between them.

In order to ease these verifications, the process server can also transmit 209 together with the ciphered data an identifier such as an identifier COM_ID of the communication device or an identifier DAT_ID of the collected data elements. In that case, as the data processing instructions signature as well as usage criteria are memorized by the secure server 201 together with an identifier of the same type, the correspondence between the content of message 209 and the data processing instructions signature or the usage criteria can be easily made.

If the data processing instructions signature and the usage criteria are positively verified, the secure server decipher the data elements received from the process entity 202 using the adapted deciphering means and apply the authorized process using these data elements as an input in order to generate a set of at least one output data element.

The output data element is then transmitted 210 to the process entity 202 and can be used freely.

Thanks to this technology, the confidence of the data owner when providing data in a communication system is improved as he knows what can and what cannot be done with his data. Nothing can be done unless authorized by the user. This is particularly important to protect the users' privacy, in particular when using platforms implementing for example social networks or online shopping. Nowadays, a tremendous amount of data is collected without the user being certain of what can or cannot be done with it.

Advantageously, the invention provides an efficient way for the data owner to monetize its data. By defining a usage criteria allowing to verify if the operator has paid for accessing to the result of a process applied to the provided data elements, the data owner is able to make sure that it has been paid for it.

According to an embodiment, it is possible for the data owner to monetize the direct access to the collected data elements. For example, if the collected data elements are enciphered by the communication device and that deciphering means needed for deciphering the data elements are memorized by the security server 201, the process entity 202 can purchase a full access to the data elements. For that purpose, a specific usage criteria can be defined. For fulfilling this criteria, the process entity 202 needs to provide the secure server 201 with a proof that an amount required to get the full access to the data element has been paid. The proof is transmitted to the secure server 201 by the process server 202 and in case of a positive verification, the deciphering means are transmitted to the process entity 202. To transmit these means securely, a secret key Tk2 known by both secure server 201 and process server 202 can be used to encrypt these deciphering means.

Therefore, it is possible for the data owner to define two alternatives for monetizing the access to its data by a given process entity.

In a first monetization option, a first predefined amount is paid by the operator of the process entity 202 and a proof is transmitted to the secure security server 201. This paid amount allows for the security server 201 to access to the result obtained by applying a process authorized by the data owner to the data elements. In that case, the process server 202 has no access to the collected data elements in clear. It has access only to the result of the process applied by the secure server to the provided data elements.

In a second monetization option, a second predefined amount is paid by the operator of the process entity 202 and a proof is transmitted to the secure security server 201. This second predefined amount is likely to be higher than the first one as it allows the process server 202 to access directly to the data elements. Once the secure server 201 has verified that the required amount was paid, the deciphering means needed to decipher the data elements is communicated to the process entity 202. The process entity is then able to decipher the data elements provided by the communication device 200 and is free to apply any process to them. In that case, the secure server 201 is responsible of verifying the payment and to transmit said securely means to the process entity 202.

The invention claimed is:

1. A method for controlling by a server, called secure server, the use of a first set of at least one data element of a data owner and provided by a communication device, the method comprising the steps of:
   receiving at least one digital signature representative of a process authorized by the data owner and adapted to carry out a series of at least one instruction using the first set of at least one data element;
   receiving from a process entity the series of at least one instruction, and a ciphered version of the first set of at least one data element which is communicated to the process entity by the communication device;
   verifying that the series of at least one instruction correspond to a process authorized by the data owner of the communication device by comparing the at least one digital signature received by the secure server with a digital signature obtained by the secure server using as an input the series of at least one instruction received by the secure server;
   and if the series of at least one instruction correspond to an authorized process:
      i. deciphering the first set of at least one data element;
      ii. generating a result data by executing the series of at least one instruction using the first set of at least one data element as an input;
      iii. transmitting the result data to the process entity.

2. The method according to claim 1, wherein the at least one digital signature representative of the process authorized by the data owner is received by the secure server from the communication device.

3. The method according to claim 1, wherein the at least one digital signature representative of the process authorized by the data owner is received by the secure server from a device on which the data owner is authenticated, said device being distinct from the communication device.

4. The method according to claim 1, comprising the step of receiving in addition to the at least one digital signature representative of a process authorized by the data owner a second set of at least one data element defining at least one condition to be met for processing the first set of at least one data element.

5. The method according to claim 4, wherein the second set of at least one data element is received by the secure server from the communication device.

6. The method according to claim 4, wherein the second set of at least one data element is received by the secure server from a device on which the data owner is authenticated, said device being distinct from the communication device is received by the secure server from a device on which the data owner is authenticated, said device being distinct from the communication device.

7. The method according to claim 4, comprising the step of verifying that the at least one condition defined by the second set of at least one data element is met before applying the step of deciphering the first set of at least one data element.

8. The method according to claim 4, wherein at least one data element of the second set defines a limited time availability for the first set of data elements to be processed by the process entity.

9. The method according to claim 4, wherein at least one data element of the second set defines a price to be paid by an operator of the process entity to obtain the data result determined by the secure server.

10. The method according to claim 1, wherein the digital signature is obtained using as an input the instructions of the process authorized by the data owner.

11. A secure server for controlling the use of a first set of at least one data element of a data owner and provided by a communication device, the secure server being configured to:
receive at least one digital signature representative of a process authorized by the data owner and adapted to carry out a series of at least one instructions using the first set of at least one data element;
receive from a process entity the series of at least one instruction, and a ciphered version of the first set of at least one data element which is communicated to the process entity by the communication device;
verify that the series of at least one instruction correspond to a process authorized by the data owner of the communication device by comparing the at least one digital signature received by the secure server with a digital signature obtained by the secure server using as an input the series of at least one instruction received by the secure server;
and if the series of at least one instruction correspond to an authorized process:
  i. decipher the first set of at least one data element;
  ii. generate result data by executing the series of at least one instruction using the first set of at least one data element as an input;
  iii. transmit the result data to the process entity.

12. A system comprising a communication device, a process entity and a server called secure server for controlling the use of a first set of at least one data element of a data owner and provided by the communication device, the system being configured to implement a method having the steps of:
receiving at least one digital signature representative of a process authorized by the data owner and adapted to carry out a series of at least one instruction using the first set of at least one data element;
receiving from a process entity the series of at least one instruction, and a ciphered version of the first set of at least one data element which is communicated to the process entity by the communication device;
verifying that the series of at least one instruction correspond to a process authorized by the data owner of the communication device by comparing the at least one digital signature received by the secure server with a digital signature obtained by the secure server using as an input the series of at least one instruction received by the secure server;
and if the series of at least one instruction correspond to an authorized process:
  i. deciphering the first set of at least one data element;
  ii. generating a result data by executing the series of at least one instruction using the first set of at least one data element as an input;
  iii. transmitting the result data to the process entity.

13. The system of claim 12, wherein the at least one digital signature representative of the process authorized by the data owner is received by the secure server from the communication device.

14. The system of claim 12, wherein the at least one digital signature representative of the process authorized by the data owner is received by the secure server from a device on which the data owner is authenticated, said device being distinct from the communication device.

15. The system of claim 12, the method further having the step of receiving in addition to the at least one digital signature representative of a process authorized by the data owner a second set of at least one data element defining at least one condition to be met for processing the first set of at least one data element.

16. The system of claim 15, wherein the second set of at least one data element is received by the secure server from the communication device.

17. The system of claim 15, wherein the second set of at least one data element is received by the secure server from a device on which the data owner is authenticated, said device being distinct from the communication device is received by the secure server from a device on which the data owner is authenticated, said device being distinct from the communication device.

18. The system of claim 15, the method further having the step of verifying that the at least one condition defined by the second set of at least one data element is met before applying the step of deciphering the first set of at least one data element.

19. The system of claim 15, wherein at least one data element of the second set defines a limited time availability for the first set of data elements to be processed by the process entity.

20. The system of claim 15, wherein at least one data element of the second set defines a price to be paid by an operator of the process entity to obtain the data result determined by the secure server.

21. The system of claim 12, wherein the digital signature is obtained using as an input the instructions of the process authorized by the data owner.

* * * * *